United States Patent [19]

Harper et al.

[11] Patent Number: 5,621,431
[45] Date of Patent: Apr. 15, 1997

[54] ANIMATION SYSTEM HAVING VARIABLE VIDEO DISPLAY RATE

[75] Inventors: Dennis D. Harper, Campbell; Frank Kuan, San Jose, both of Calif.

[73] Assignee: Atari Games Corporation, Milpitas, Calif.

[21] Appl. No.: 235,094

[22] Filed: Apr. 29, 1994

[51] Int. Cl.⁶ ........................................ G09G 5/34
[52] U.S. Cl. .............................. 345/122; 395/173
[58] Field of Search ........................ 345/122, 121, 345/156, 123, 125; 395/152; 273/434, 437; 434/37, 38

[56] References Cited

U.S. PATENT DOCUMENTS

| | | | |
|---|---|---|---|
| 3,747,087 | 7/1973 | Harrison | 340/324 |
| 4,296,476 | 10/1981 | Mayer | 364/900 |
| 4,498,079 | 2/1985 | Ghosh | 340/725 |
| 4,517,654 | 5/1985 | Carmean | 364/521 |
| 4,600,919 | 7/1986 | Stern. | |
| 4,616,217 | 10/1986 | Nesbitt | 340/747 |
| 4,760,390 | 7/1988 | Maine et al.. | |
| 4,766,423 | 8/1988 | Ono et al.. | |
| 4,774,506 | 9/1988 | Bossoutrout et al.. | |
| 4,797,836 | 1/1989 | Witek et al.. | |
| 5,025,394 | 6/1991 | Parke. | |
| 5,046,026 | 9/1991 | Tolomei. | |
| 5,214,758 | 5/1993 | Ohba et al.. | |
| 5,252,953 | 10/1993 | Sandrew et al.. | |
| 5,287,446 | 2/1994 | Williams et al.. | |
| 5,404,437 | 4/1995 | Nguyen | 395/152 |

FOREIGN PATENT DOCUMENTS

94/23361  10/1994  WIPO.

OTHER PUBLICATIONS

"Video Frame–Rate Reduction Technique" *IBM Technical Disclosure Bulletin*, vol. 37 No. 06B, pp. 423–429, Jun. 1994.

*Primary Examiner*—Richard Hjerpe
*Assistant Examiner*—Chanh Nguyen
*Attorney, Agent, or Firm*—Knobbe, Martens, Olsn & Bear

[57] ABSTRACT

The present invention comprises a method and apparatus for finely controlling the rate of animation display in applications such as a video game or simulator. In one embodiment, a floating point animation timer selectively varies or eliminates the number of update periods a video cell is to be displayed to match the display time of the script to a determined time. The determined time can be empirically chosen or dynamically calculated based on the user's input. In another embodiment a sequence table provides an array of update times corresponding to the cells in a script. The number of update times a video cell is displayed can be varied to emphasize certain actions in the animation sequence. This provides a programmer with the ability to create a variety of animation sequences from a limited number of video cells and to finely manipulate the animated character to achieve a specific action.

24 Claims, 4 Drawing Sheets

ANIMATION DISPLAY SYSTEM

ANIMATION SYSTEM HAVING VARIABLE VIDEO DISPLAY RATE

FIELD OF THE INVENTION

The present invention generally relates to a method and apparatus for displaying a sequence of video cells at variable speeds, and specifically relates to a method and apparatus for providing fine control of the animation rate in applications such as video games and simulators by varying the speed of display of each cell in the sequence or selectively eliminating cells from the sequence so that the animation sequence is realistically displayed during a determined time period.

BACKGROUND OF THE INVENTION

Animation in applications such as video games and simulators is generated by displaying on a video display a series of digitized video images or cells while a CPU is executing commands from a software program that accompanies the cells. A script, which defines the display order of the cells and the operation sequence of their associated software commands, is created by a programmer to achieve the desired action of the animated characters on the video display. Most video games and simulators involving action figures have limited sequences of video cells that may be displayed to the player. To increase the variety of the displayed video, the sequences are shown at different speeds at different times during the video game. Generally, the video screen is a raster-type display which is updated 60 times a second or stated another way, at 60 Hz.

A typical video game is programmed to display each cell in a sequence of video cells for the same integral number of update periods. For example, an animation sequence containing 30 frames or cells is programmed to be displayed at a rate of four update periods per cell. In this case, the sequence is displayed for 120 update periods or 2 seconds. The same sequence is programmed to be displayed at a later time for two update periods per cell or one second. This results in the character in the later animation sequence moving more quickly than in the previous sequence. However, this method of programming the display time of an animation sequence is limited to using the same number of update periods for each video cell in the sequence and the actions of the animated character are uniformly sped up or slowed down.

SUMMARY OF THE INVENTION

The present invention provides fine control of the rate of animation display in applications such as video games and simulators by using a floating point animation timer or a sequence table to selectively vary the number of update periods for display of each video cell in the sequence.

In one embodiment of the present invention, a floating point animation timer is used to adjust the number of update periods of each cell in a script. The timer matches the display time of the script to a determined number of update periods. The determined time is empirically created by a programmer or dynamically calculated by a processor based on the user's input to the video game or simulator. Once the time period for displaying a sequence of cells is determined, the sequence is recalled from memory. The floating point animator timer then variably displays each of the cells so that the entire sequence is displayed for the determined time period. If the determined time period is greater than the minimum display time of the sequence, which is defined as the time required to display each video cell for one update period, the floating point animation timer will increase the number of video display update periods for selected cells so that the sequence is complete at the end of the determined period. Similarly, if the determined time period is less than the minimum time for the sequence, the floating point animation timer will eliminate certain cells from the video display so that the sequence can be completed within the determined period.

The timing for display of each of the sequences of the cells must account for the independent action of the various characters being displayed on the screen. This independent action results from the CPU executing the script software commands associated with the video cells. For example, a character is shown moving its legs as if walking by displaying a sequence of animation cells. It is the software commands in the script associated with the cells that cause the position of the character on the screen to change. Without executing the software commands, the character "walks in place" on the video screen. Thus, if the floating point animation timer were to skip selected cells and their associated commands, the actions of the characters from the remaining animation cells would not coincide with the action of the characters from the remaining software commands. In a further example, a character may suddenly disappear from the left side of the display and suddenly reappear on the right side of the display if the commands to change the characters position across the display are eliminated. To resolve this problem, the floating point animation timer actually sequences through all of the video cells in a script, but the cells which are eliminated are processed at a rate faster than the update rate of the display and therefore are not shown. The software commands associated with each cell in the script are also processed and therefore, the display sequence of the cells and the software commands remain coordinated with each other and the independent actions of the characters appear to be continuous. The floating point animation timer provides the programmer with the ability to finely control the animation rate and thus create a large variety of animation sequences In another embodiment, fine control of the rate of animation is provided by a sequence table. The sequence table is stored in memory and is programmed to display each cell in the script for a specific number of update periods. For example, cells showing a human arm extending toward an opponent can be programmed in the sequence table to be shown for fewer update periods than are used to illustrate the arm as it is retracting. This causes the arm to appear to travel faster while extending than when retracting (i.e. a fast punch). Thus, the sequence table also gives the programmer the ability to minutely adjust the animation to create unique movements of the animated characters.

DETAILED DESCRIPTIONS OF THE PREFERRED EMBODIMENTS

Figure 1:
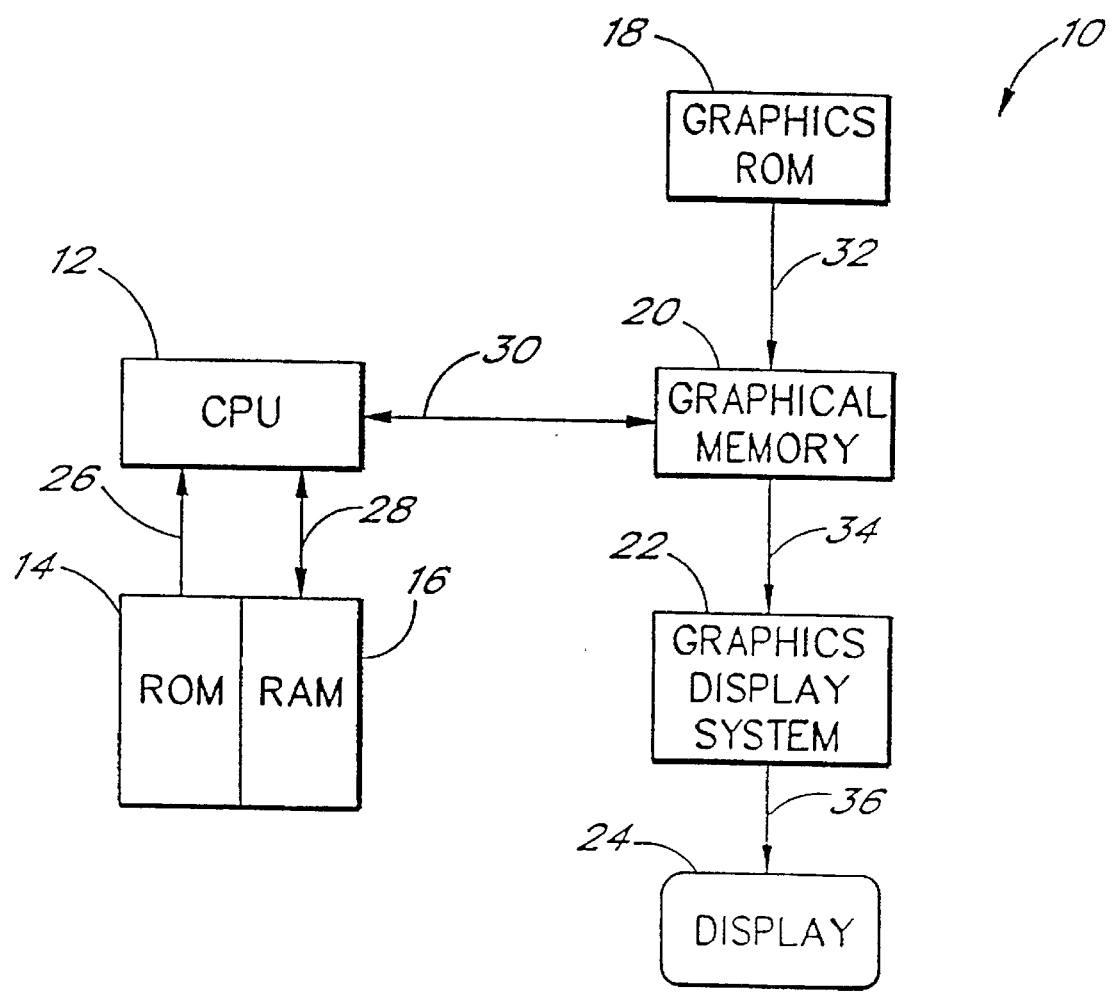
FIG. 1 is a functional block diagram illustrating a typical animation display system.

As shown in FIG. 1, an animation display system 10 comprises a Central Processing Unit (CPU) 12 with an associated Read Only Memory (ROM) 14 and an associated Random Access Memory (RAM) 16, a graphics ROM 18, a graphical memory 20, a graphics display system 22, and a video display 24. In the animation display system 10, the CPU 12, accesses the ROM 14 over a unidirectional communication bus 26 and the RAM 16 over a bi-directional communication bus 28. The graphical memory 20 communicates with the CPU 12 through a bi-directional bus 30 and the graphics ROM 18 is accessed by the graphical memory 20 through a unidirectional communication bus 32. The graphics display system 22 is connected to the graphical memory through a communication port 34. The video display 24 is connected to the graphics display system 22 through a port 36.

Referring to FIG. 1, code and data defining the script, such as the order of the cells and the commands associated with the character position for each cell, are stored in the ROM 14 and RAM 16. The digitized pixels representing a plurality of cells of video images are stored in the graphics ROM 18 and a series of parameters such as sprites or motion objects which affect the manner in which the cells are displayed are stored in the graphical memory 20. The CPU 12 which, in a preferred embodiment, is a Motorola 680EC20 processor, executes the code stored in the ROM 14 utilizing data stored in the RAM 16. In the process of executing the code, the CPU 12 stores values in the graphical memory 20 which represent the locations of specific video cells in the graphics ROM 18. The cells are manipulated using parameters stored in the graphical memory 20 and retrieved by the graphics display system 22.

The graphics display system 22 is an apparatus unique to a particular format of graphics and is associated with a particular type of graphical memory 20 as is well known to one skilled in the art of video animation. The graphics display system 22 retrieves the locations of the video cells to be displayed from the graphical memory 20 once an update period. Video information from the graphics ROM 18 and the graphical memory 20, and commands from the CPU 12 are translated by the graphics display system 22 through the port 34 from the graphical memory 20 to a format suitable for display on the video display 24. The video display 24 can be any number of well known video displays configured to display video scenes to a viewer, such as CRT display.

The video display produces an output, vertical blank, every update period which is used to interrupt the software program. The vertical blank interrupt synchronizes the software program to the video display to smooth (i.e. not jumpy but flowing) the animation sequences on the display. The CPU 12 can overwrite the storage area in the graphical memory 20 with many video cell locations between update periods of the video display 24 but the video cell whose location is retrieved by the graphics display system 22, which occurs only once per update period, is the video cell which is displayed. The execution of the software program which updates the graphical memory 20 with the location of a video cell and the periodic display of the video cell results in an animation sequence.

Figure 2:
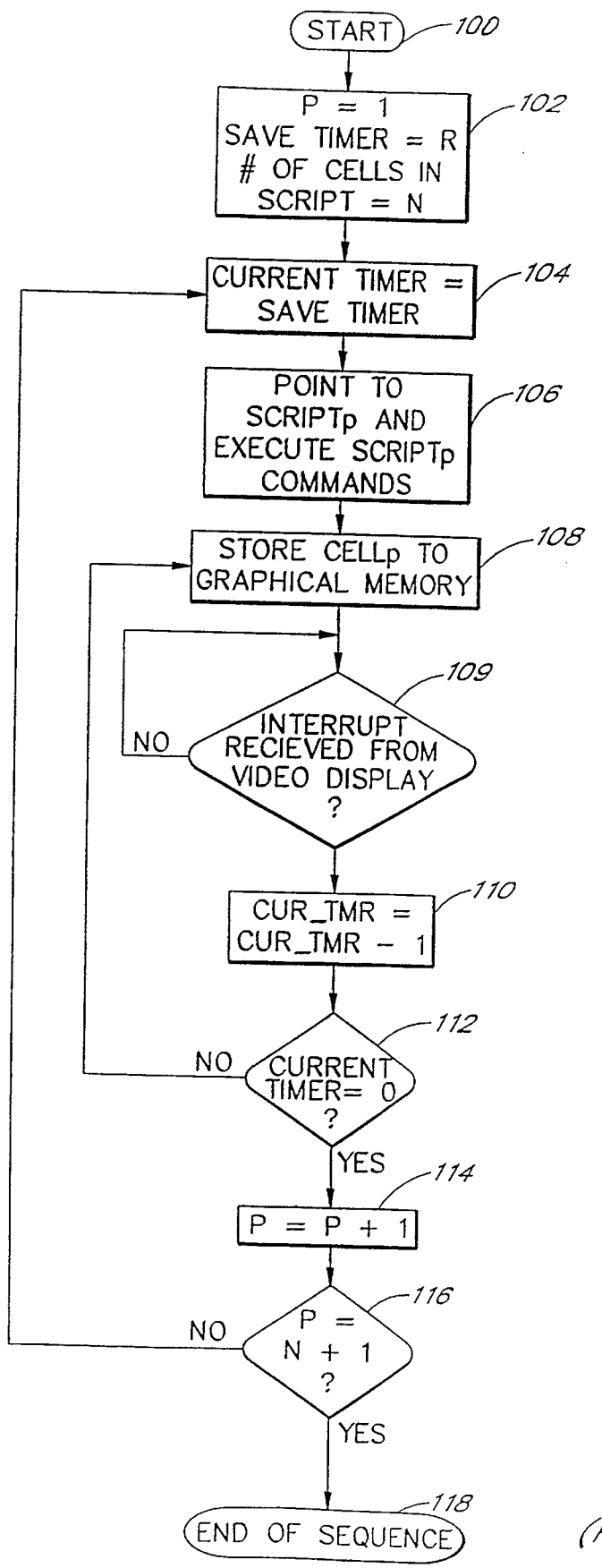
FIG. 2 is a flow diagram illustrating a typical prior art operation for varying the animation rate in a video presentation.

Prior to execution of the prior art method of varying the animation rate, as shown in FIG. 2, a predetermined integral number of update periods to display each cell in the script (R) is stored in the ROM 14 and is used by the CPU 12 in executing the code. The number of cells in the script (N) is also stored in memory. From a start state 100, the system moves to state 102 wherein a counter P, is set to one, a constant, save timer, is set equal to the number of the predetermined of update periods (R), and a variable N is set equal to the number of cells in the script. The system next moves to state 104 where a variable, current timer, is set equal to the save timer. In state 106 the system points to $script_p$ and executes the $script_p$ commands associated with video $cell_p$. The system moves to state 108 wherein the CPU 12 stores the location in the graphics ROM 18 of video $cell_p$ to the graphical memory 20. In decision block 109 the system waits for an interrupt from the video display 24 at which time video $cell_p$ is displayed on the video display 24. The system then moves to state 110 where the current timer is decremented by one.

In decision block 112, the prior art method determines if the current timer has been decremented down to zero. If the current timer is not equal to zero, the routine returns to state 108 followed by state 109 where video $cell_p$ is displayed for one more update period and in state 110 the current timer is again decremented. The routine continues in this loop defined by states 108, 109, 110, and 112 until the current timer equals zero in decision block 112. Then the counter P is incremented in state 114 and the CPU points to the next video cell in the script. In decision block 116, P is compared to the number of cells in the script. If P is less than or equal to the number of cells in the script, the routine returns to state 104 where the current timer is again set equal to the save timer and the loop defined by states 104 through 116 is executed again with the next video cell. If in decision block 116, P is greater than the number of cells in the script, the end of the sequence has been reached and the routine moves to end block 118. It can be seen from the prior art method that each video cell in the script is displayed for the predetermined integral number of update periods (R), and the animation rate can be either uniformly increased or decreased.

Figures 3, 3A:
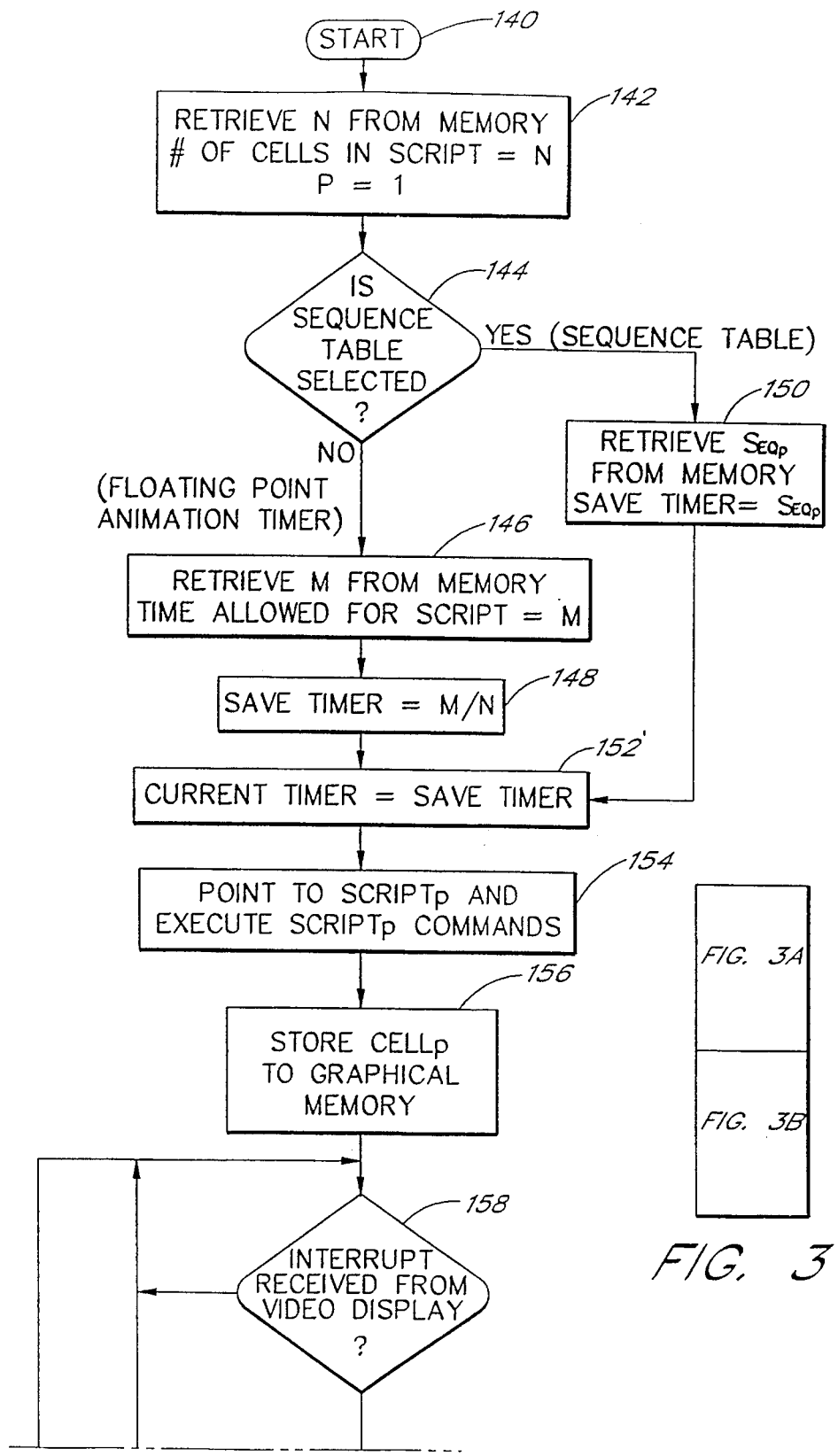
FIGS. 3 and 3A and 3B are a flow diagrams illustrating the process for minutely controlling the rate of animation for a video presentation of the present invention.

The limitations of the prior art are overcome in the present invention. Referring to FIG. 3A, the method of finely varying the animation rate begins at a start state 140. The system then moves to state 142 wherein a counter P is set to one and the number of video cells in the script N, is retrieved from memory. In decision block 144, the system determines whether the sequence table or floating point animation timer has been selected by reading the state of a variable which is determined by the programmer. If a floating point animation timer is selected, the system moves to state 146 wherein a display time M for the script is retrieved from memory or dynamically calculated based on the user's input. The value of the save timer, which is used to define the number of update periods each video cell in the script is displayed, is calculated in state 148 and is SAVE TIMER$_{floating\ point\ animation\ timer}$=M/N where M=the determined time and N=the number of cells in the script.

If the sequence table is selected in decision block 144, the system moves to state 150 wherein the value of the sequence table is retrieved from in memory and the value of the save timer is SAVE TIMER$_{sequence\ table}$=SEQ$_p$ where SEQ$_p$ is the $p^{th}$ element of the sequence table and P is a counter.

The sequence table is an array of numbers where each element represents the number of update periods an individual video cell is to be displayed. The first video cell is displayed for the number of update periods found in the first element of the sequence table; the second video cell is displayed for the number of update periods found in the second element of the sequence table; furthermore, the $p^{th}$ video cell is displayed for the number of update periods found in the $p^{th}$ element of the sequence table, $SEQ_p$. The elements in the sequence table are integral numbers and have no relationship to each other. They do have a one to one correspondence to the video cells in the script.

"Save timer" can be an integral or a fractional number. When the save timer is an integral number, each video cell in the script is displayed for the same number of update periods. When the save timer is a fractional number greater than one, the number of update periods each video cell is displayed varies to fit the animation sequence in the time allocated for it. When the save timer is a fractional number less than one, certain cells in the script are eliminated from the display to reduce the animation sequence display time to match its allocated time. The method used to vary the number of update periods for video cells and to eliminate selected video cells is described hereafter.

The system then moves to state 152 wherein the value of a variable, "current timer", is set equal to the value of the save timer. Next, in state 154, a subset of the software program stored in the ROM 14 and associated with video $cell_p$, noted as $script_p$, are pointed to and executed by the CPU 12. These $script_p$ commands may cause an x or y coordinate of the video cell to change resulting in the animated character moving horizontally or vertically in the display. The system then moves to state 156 wherein the CPU 12 stores the location in graphics ROM 18 of video $cell_p$ to the graphical memory 20. In decision block 158, the system waits for an interrupt to be received from the video display 24. Until the interrupt is received, the system stays in the loop formed by decision block 158. When the interrupt is received, which occurs once each video display update period, video $cell_p$ is displayed on the video display 24 by the graphics display system 22 and the system moves to state 160 in FIG. 3B wherein the current timer value is decremented by one.

The system next moves to decision block 162 and determines if the value of the timer is less than or equal to zero. If the timer is not less than or equal to zero, the system returns to state 158 wherein the system waits for an interrupt to be received from the video monitor and video $cell_p$ is displayed for another update period. The routine remains in the loop defined by states 158, 160 and 162, displaying video $cell_p$ as long as the current timer is greater than zero. Video $cell_p$ is displayed for an update period each time the loop is executed.

Figure 3B:
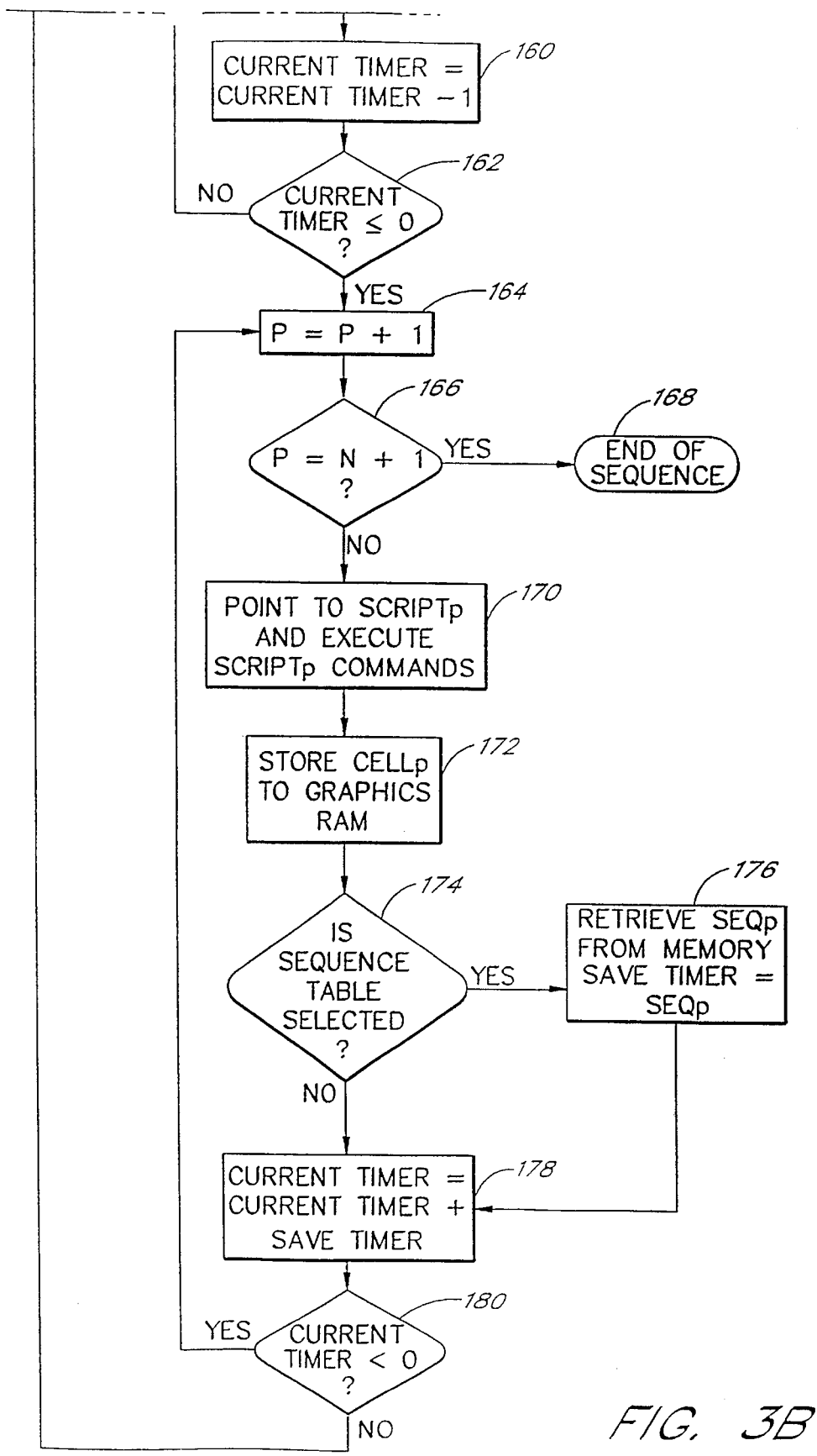

Referring to FIG. 3B, when the timer is less than or equal to zero in decision block 162, the system moves to state 164 wherein counter P is incremented by one. If, in decision block 166, P is greater than the number of cells in the script, then the end of the animation sequence is reached in state 168, and processing of data in this routine is terminated. If, in decision block 166, P is less than or equal to the number of cells in the script, then the system moves to state 170 wherein $script_p$, which is now the portion of the software program associated with the next video cell in the script, is pointed to by the CPU 12 and the $script_p$ commands are executed by the CPU 12. In state 172, the CPU 12 stores to the graphical memory 20 the location in the graphics ROM 18 of video cellP. In decision block 174 the system determines if the sequence table or the floating point animation timer is selected. If the sequence table is selected, the system moves to state 176 wherein the next entry in the sequence table, $SEQ_p$, is retrieved from ROM 14 and the new value of the save timer is set equal to $SEQ_p$. The system then moves to state 178. If the floating point animation timer is selected in decision block 174, then the system also moves to state 178.

In state 178, the new value of the current timer is set equal to previous value of the current timer plus the save timer which is either the next value in the sequence table if the sequence table is selected or the determined time divided by the number of cells in the script if the floating point animation timer is selected. The system moves to decision block 180 wherein the new value of the current timer is compared to zero. If the value of the current timer is not less than zero (i.e. the current timer is zero or greater), the routine returns to state 158 where the system waits for an interrupt from the video display 24. "Video $cell_p$" is displayed for an update period until the current timer is decremented to zero or less while the system is executing the loop defined by states 158, 160, and 162.

If, in decision block 180, the value of the timer is less than zero, the routine returns to state 164, wherein the counter P is again incremented by one. Operation in states 166, 168, 170, 172, 174, 176, 178, and 180 proceeds as described above.

The system moves to decision block 166 and again determines if the end of script is reached. If the end of the animation sequence is not reached, the system moves to state 170 where $script_p$ pointed to by the CPU 12 and $script_p$ commands are executed. Again in state 172, the CPU 12 stores the location in the graphics ROM of the Video $cell_p$ to the graphical memory. In decision block 174, the system determines if the sequence table or the floating point animation timer has been selected by the user.

If the sequence table is selected, the system sets the save timer equal to the next value in the sequence table. The system proceeds to state 178 from either state 174 directly or from state 176 where the new value of the current timer is calculated and in decision block 180 the new value of the current timer is compared to zero. If the current timer is greater than or equal to zero the routine returns to state 158 and the video $cell_p$ is displayed in a first loop formed by states 158, 160, and 162. If the timer is still less than zero the routine returns to state 164 which results in video $cell_p$ not being displayed. The routine continues in a second loop defined by states 164 through 180. In this manner, the system sequentially executes the $script_p$ commands but video $cell_p$ is not displayed until the current timer is not less than zero whereby the system goes to the beginning of the first loop at state 158.

In summary, the process as described above provides three operational variations for controlling animation rates dependent on the value of the current timer in state 152 and 178. In the first variation, if the value of the current timer in state 152 is a positive fractional number less than one, the determined number of update periods allocated for the script is less than the minimum display time of the script. In this case, the system causes the current timer to become less than zero in state 160. Counter P is incremented in state 164 and the $script_p$ commands are executed in state 170. Although the CPU 12 stores the location of video $cell_p$ in the graphical memory 20, video $cell_p$ is not displayed. The video cell displayed is the one whose location is stored in the graphical memory 20 at the time the interrupt is received from the video display 24 in state 158. As the system loops through states 164 through 180, only periodically, depending on the value of the save timer which is a fraction less than one, will the current timer be not less than zero in decision block 180 and move to state 158 where video $cell_p$ is displayed. In this manner the present invention eliminates selected cells from the animation sequence to match the display time of the script to the determined time and continues to sequentially execute the $script_p$ commands to account for the independent action of the characters on the screen.

Secondly, if the value of the current timer in state 152 is a fractional number greater than one, the determined time allocated for the script is greater than the minimum time of the script. In this case, the system remains in the loop defined by states 158, 160, and 162 until the current timer is less than zero. In state 178 the value of the save timer is added to the value of the current timer and depending on the value of the save timer, which is a fractional number greater than one, the number of times the current timer is decremented by one in state 160 until it is less than zero varies. In this manner, some of the video cells in the script are displayed for more update periods than others in order to equal the determined display time.

In the third variation, if the current timer in state 152 is an integral number, the system remains in the loop defined by states 158, 160, and 162 until the current timer equals zero in state 162. Video cells in the script will be displayed for the number of update periods equal to the value of the current timer. If in state 178, the new value of the current timer is also an integral number, when the system returns to state 158, the loop defined by states 158, 160, and 162 is again executed until the timer is decremented to zero. In this manner, the system displays each video cell for the number of update periods defined by the programmer.

In view of the prior art, it can be appreciated that the present invention provides greater control in the creation of animation sequences. The prior art is limited to uniformly increasing or decreasing the animation rate while displaying every video cell in the script. The present invention does this and in addition, it selectively varies the number of update periods each video cell is displayed and selectively eliminates video cells from the script while maintaining the continuity of the independent actions of the characters. This allows the programmer to finely manipulate the actions of animated characters. Thus, the present invention overcomes the limitations of the prior art by providing the programmer with a method and apparatus to create unlimited variations of animation sequences from a limited number of video cells.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed:

1. An animation display system comprising:

a video cell storage device;

a plurality of video cells stored in the video cell storage device, said video cells defining an animation sequence;

a display device having an update period, said display device connected to the video cell storage device so as to display one or more of the plurality of video cells for periods of time defined by the display device update period; and, a display controller connected to the storage device and to the display device so as to control the amount of time individual ones of the video cells are displayed on said display device such that the animation sequence is displayed in a pre-determined time period and wherein, if the pre-determined time period is less than the time required to display each cell of the sequence for one update period, then said display controller processes at least one selected cell at a rate faster than the update rate of the display device so that the selected cell is not displayed, such that the total number of update periods for the cells in the animation sequence that are displayed produces a sequence display period that is substantially equal to the predetermined time period.

2. An animation display system as defined in claim 1, wherein the display controller comprises a floating point animation timer configured to adjust the number of update periods that each cell is displayed such that the total number of update periods for the cells in the animation sequence produces a sequence display period that is substantially equal to the predetermined time period.

3. An animation display system as defined in claim 2, wherein the floating point animation timer adjusts the number of update periods of one of the cells to a different total than it adjusts those of another of the cells, so as to effect a desired result in the visual presentation of the animation sequence on the display device.

4. An animation display system as defined in claim 2 wherein, if the pre-determined time period is greater than the time required to display each cell of the sequence for one update period, then the floating point animation timer increases the number of update periods for at least one selected cell such that the total number of update periods for the cells in the animation sequence produces a sequence display period that is substantially equal to the predetermined time period.

5. An animation display system as defined in claim 4, wherein the display controller additionally comprises a sequence table including members defining update periods for each of the cells of the animation sequence, thereby indicating the display time for each of the cells in the animation sequence.

6. An animation display system as defined in claim 5, wherein the number of update periods of one of the cells is different than the number of update periods of another of the cells, such that the visual presentation of the animation sequence on the display device, with each cell displayed for the number of update periods indicated in the sequence table for that cell, conforms to a desired result.

7. An animation display system as defined in claim 1, wherein the pre-determined time period is defined by input from a programmer when the display system is not in active use.

8. An animation display system as defined in claim 1, wherein the pre-determined time period is defined in response to a user's input during active operation of the animation display system.

9. An animation display system as defined in claim 1 wherein display control commands associated with said at least one selected cell are processed prior to the display of any subsequent video cell in the animation sequence.

10. An animation system comprising:

a video cell storage device;

a plurality of video cells stored in the video cell storage device, said video cells defining an animation sequence;

a display device having an update period, said display device connected to the video cell storage device so as to display one or more of the plurality of video cells for periods of time defined by the display device update period; and, a display controller connected to the storage device and to the display device so as to variably control the amount of time individual video cells are displayed on the display device and wherein said display controller processes at least one selected cell at a rate faster than the update rate of the display device so that the selected cell is not displayed.

11. An animation system as defined in claim 10, wherein the display controller varies the amount of time the video cells are displayed such that the animation sequence is displayed on the display device within a given time period.

12. An animation display system as defined in claim 10 wherein display control commands associated with said at least one selected cell are processed prior to the display of any subsequent video cell in the animation sequence.

13. A method of displaying an animation sequence comprising the steps of:

storing a plurality of video cells in a storage device, said video cells defining an animation sequence;

displaying individual ones of the video cells on a display device having an update period wherein video cells are displayed for periods of time defined by the display device update period; and controlling the amount of time individual ones of the video cells are displayed on the display device such that the animation sequence is displayed in a pre-determined time period and such that, if the pre-determined time period is less than the time required to display each cell of the sequence for one update period, at least one selected cell is processed at a rate faster than the update rate of the display device so that the selected cell is not displayed, and so that the total number of update periods for the cells in the animation sequence that are displayed produces a sequence display period that is substantially equal to the predetermined time period.

14. A method of displaying an animation sequence as defined in claim 13, wherein the step of controlling the amount of time comprises adjusting the number of update periods that each cell is displayed such that the total number of update periods for the cells in the sequence produces a sequence display period that is substantially equal to the pre-determined time period.

15. A method of displaying an animation sequence as defined in claim 14, wherein the number of update periods of one of the cells is adjusted to a value that is different from that of another of the cells, so as to effect a desired result in the visual presentation of the animation sequence on the display device.

16. A method of displaying an animation sequence as defined in claim 14 wherein, if the pre-determined time period is greater than the time required to display each cell of the sequence for one update period, then the number of update periods for at least one selected cell is increased such that the total number of update periods for the cells in the animation sequence produces a sequence display period that is substantially equal to the predetermined time period.

17. A method of displaying an animation sequence as defined in claim 16, wherein numbers defining the update periods for each of the cells in the animation sequence are contained in a sequence table, thereby indicating the display time for each of the cells in the animation sequence.

18. A method of displaying an animation sequence as defined in claim 17, wherein the number of update periods of one of the cells is different than the number of update periods of another of the cells, such that the visual presentation of the animation sequence on the display device, with each cell displayed for the number of update periods indicated in the sequence table for that cell, conforms to a desired result.

19. A method of displaying an animation sequence as defined in claim 13 wherein the pre-determined time period is defined by input from a programmer when the display system is not in active use.

20. A method of displaying an animation sequence as defined in claim 13, wherein the pre-determined time period is defined in response to a user's input during active operation of the animation display system.

21. A method of displaying an animation sequence as defined in claim 13, further comprising the step of processing software commands associated with said at least one selected cell prior to displaying any subsequent video cell in the animation sequence.

22. A method of displaying an animation sequence comprising the steps of:

storing a plurality of video cells in a storage device, said video cells defining an animation sequence;

displaying individual ones of the video cells on a display device having an update period wherein video cells are displayed for periods of time defined by the display device update period; and variably controlling the amount of time individual ones of the video cells are displayed on the display device such that at least one selected cell is processed at a rate faster than the update rate of the display device so that the selected cell is not displayed.

23. A method of displaying an animation sequence as defined in claim 22, wherein the step of variably controlling the amount of time comprises the step of varying the amount of time the video cells are displayed such that the animation sequence is displayed on the display device within a given time period.

24. A method of displaying an animation sequence as defined in claim 22, further comprising the step of processing software commands associated with said at least one selected cell prior to displaying any subsequent video cell in the animation sequence.

* * * * *